United States Patent Office 3,577,466
Patented May 4, 1971

3,577,466
PRODUCTION OF ALLYLIC ETHERS
Kenzie Nozaki, El Cerrito, Calif., assignor to Shell Oil Company, New York, N.Y.
No Drawing. Filed July 30, 1968, Ser. No. 748,652
Int. Cl. C07c 43/14
U.S. Cl. 260—614           9 Claims

ABSTRACT OF THE DISCLOSURE

Production of allylic ethers by reacting in high conversion an allylic alcohol of the formula

R—CH=CH—CHR'—OH where R is hydrogen, methyl or hydroxymethyl and R' is hydrogen or methyl, with itself or with a nonallylic alcohol in the presence as catalyst of cupric chloride or bromide or additionally in the presence as catalyst promoter of an acidic material or an allylic halide, where the halide is chloride or bromide.

BACKGROUND OF THE INVENTION

Production of allylic ethers in which an allyl alcohol is reacted with itself or with another alcohol in the presence of certain catalysts is known. Exemplary of such processes is that of W. H. Watanabe and L. E. Conlon, U.S. Patent 2,847,477, issued Aug. 12, 1958, which discloses allylic ether production in the presence of a catalyst composed of a salt of mercury and a strong acid-acting agent such as sulfuric acid, hydrofluoric acid and boron trifluoride and its coordinated complexes. This reference notes that low yields of allyl ethers had been reported to be made from allyl alcohol and lower alkanols and the like under the influence of catalyst comprising cuprous chloride, ammonium chloride, hydrochloric acid, copper, and water. R. J. Stephenson, in U.S. Patent 3,250,813, issued May 10, 1966, discloses allylic ether production in the presence as catalyst of a cuprous salt and as co-catalyst of a trivalent inorganic acid, a Lewis acid, a sulfonic acid or an acid ion-exchange resin. In general, cuprous salts are unstable and it would be advantageous to be able to produce allylic ethers by use of highly active stable catalytic systems.

SUMMARY OF THE INVENTION

It has now been found that an allylic ether is produced by reacting in high conversion an allylic alcohol of the formula

R—CH=CH—CHR'—OH where R is hydrogen, methyl or hydroxymethyl and R' is hydrogen or methyl, with itself or with a non-allylic alcohol in the presence as catalyst of cupric halide, where the halide is chloride or bromide. Although said cupric halide serves as a highly effective catalyst for the conversion of allylic alcohols to ethers, the activity of the cupric halide catalyst is enhanced by the presence within the reaction mixture of a catalyst promoter which is an acidic material or an allylic haliide, where the halide is chloride or bromide.

DESCRIPTION OF PREFERRED EMBODIMENTS

The allylic alcohol reactant to be etherified in the process of the invention may be represented by the formula R—CH=CH—CHR'—OH, where R is hydrogen, methyl or hydroxymethyl and R' is hydrogen or methyl. Thus the allylic reactant may be allyl alcohol, methallyl alcohol, crotyl alcohol, 2-butene-1,4-diol, and the like. When an allylic alcohol is reacted alone, the product is a diallyl ether. When a non-allylic alcohol is also present for reaction with the allylic alcohol, the ether product contains at least one allylic moiety and at least one non-allylic moiety. When the allylic alcohol reactant is a diol, e.g., 2-butene-1,4-diol, and reacted alone, the product is polyether; but, when the allylic diol is reacted with a non-allylic alcohl, e.g., a monohydroxy alcohol, the product is mainly diether.

The non-allylic alcohol reactant may be any of a wide range of mono- or polyhydric aliphatic alcohols. The aliphatic portion of the non-allylic aliphatic alcohol is an aliphatic moiety illustratively obtained by removal of at least one hydroxyl group of a monohydric or polyhydric alcohol wherein there is at least one alcoholic hydroxyl group that is bonded to a carbon atom which is a member of no more than two carbon-carbon bonds, i.e., wherein there is a primary or secondary alcoholic hydroxyl group. The non-allylic alcohol comprisest an aliphatic moiety having from 1 to 4 hydroxyl groups, preferably from 1 to 2, each of which is attached to an aliphatic carbon atom and at least one of which is attached to a primary or secondary carbon atom, that is, a carbon atom bound no more than twice, i.e., less than thrice, to other carbon atoms and is therefore non-tertiary, and additionally the alcohol is free from acidic hydrogens more acidic than the alcoholic hydroxyl groups present in the alcohol molecule. The non-allylic alcohol is an alcohol of up to 20 carbon atoms which is free of non-aromatic carbon-carbon unsaturation present, and is wholly aliphatic or incorporates one or more aromatic moieties within the molecule.

When the aliphatic portion of the non-allylic alcohol is wholly aliphatic and hydrocarbon, the alcohols are hydroxyalkanes, e.g., acyclic hydroxyalkanes or cyclic hydroxyalkanes, and are illustrated by monohydric alkanols such as methanol, ethanol, butanol, sec-butanol, octanol, dodecanol, 2-ethylhexanol, isobutanol and 5-octadecanol; by monohydric cycloalkanols such as cyclopentanol, cyclohexanol, 2,3,5-trimethylcyclopentanol and 1-hydroxydecalin; and by polyhydric acyclic hydroxyalkanes such as ethylene glycol, propylene glycol, glycerol, trimethylene glycol, 1,2,6 - hexanetriol, 2 - methylpenta - 2,4-diol, pentaerythritol and 1,4,8,12-dodecatetraol; as well as polyhydric cyclic hydroxyalkanes such as 1,3-cyclohexanediol, 1,3-dihydroxy-1-ethylcyclopentane, 1,4-dihydroxydecalin, 1,4-bis(hydroxymethyl)cyclohexane and 1,4,6-trihydroxydecalin.

In general, non-allylic alcohols having only saturated carbon-carbon linkages, i.e., carbon-carbon single bonds, are preferred over analogous alcohols incorporating aromatic moieties; particularly preferred are hydrocabon alcohols of up to 12 carbon atoms and from 1 to 2 hydroxyl substituents. As a class, primary alcohols are more preferred than analogous secondary alcohols, and most preferred are lower alkyl monohydric primary alcohols, i.e., primary alkanols, of up to 4 carbon atoms.

The cupric halide catalyst which is employed in the process of the invention is cupric chloride or cupric bromide. The cupric halide is usually added to the reaction mixture as a powdered solid although it can be added as a liquid in the form of a solution, e.g., either aqueous or in one or both of the reactant alcohols. The process of the invention is characterized by the requirement for only catalytic quantities of cupric halide. Although utilization of larger amounts of cupric-containing catalyst is not detrimental to the process of the invention, amounts larger than about 7% weight based on the allylic alcohol reactant are not generally required. Amounts of cupric halide less than about 0.1% weight on the same basis are generally unsuitable because of the inevitable physical losses of catalyst during reaction and processing. In most instances, amounts of catalyst from about 0.5% weight to about 5% weight based on the allylic alcohol reactant are satisfactory and are preferred.

Although either of the two cupric halides serves as an effective catalyst for the conversion of allylic alcohols to ethers, the activity of the cupric halide catalyst is enhanced by the presence within the reaction mixture of a catalyst promoter which is an acidic material or an allylic halide. The acidic material which may be employed is a non-oxidizing acid and a strong acid. By the term strong acid is meant an acid which dissociates extensively in moderately dilute aqueous solution. Acids that are sufficiently strong are those acids having a $pK_a$, defined as the negative logarithm of the ionization constant when measured at 25° C. for a 0.1 normal aqueous solution, of less than about 2.5. Illustrative of acids that are sufficiently strong are inorganic acids such as hydrohalic acids, i.e., hydrochloric or hydrobromic acid, as well as organic acids such as p-toluenesulfonic acid. Particularly preferred is the use of hydrochloric acid. Exemplary effective catalyst promoters include not only the aforementioned acidic material but also an allylic halide, e.g., chloride or bromide, and preferably an allylic halide corresponding to the allylic alcohol reactant. Without wishing to be bound by any particular theory, a possible explanation of the effectiveness of allylic halides may be that, when hydrohalic acid is present as catalyst promoter, it probably reacts with allylic alcohol reactant resulting in the formation of a small quantity of allylic halide, i.e., allylic chloride or bromide. The range of quantities of catalyst promoter utilized parallels that of the catalyst. Amounts of catalyst promoter from about 0.1% weight to about 7% weight based on the allylic alcohol reactant are generally suitable; amounts from about 0.5% weight to about 5% weight are satisfactory and are preferred. The promoter is usually added to the reaction mixture as a gas or a liquid, i.e., where these forms are appropriate. The promoter can be added in the form of a solution, e.g., aqueous with respect to the acidic material or in alcohol reactant with respect to the allylic halide.

When the process of the invention is conducted for the production of an ether containing at least one allylic moiety and at least one non-allylic moiety, then the allylic alcohol reactant and the non-allylic alcohol reactant are employed in substantially stoichiometric amounts or are employed with the non-allylic alcohol reactant in excess. When the non-allylic alcohol is polyhydric, the degree of etherification desired will determine the equivalent molar amount of each reactant. Amounts of reactants wherein the non-allylic alcohol is in excess are preferred; a 10 percent or higher excess thereof can be employed in a practical manner.

The process is suitably conducted throughout a moderate range of reaction temperature and pressures, so long as the reactants are maintained substantially in the liquid phase. Reaction temperatures from about 50° to about 150° C. are satisfactory, although temperatures from about 70° to about 120° C. are preferred. The reaction is conducted preferably at atmospheric pressure, but, if desired, at sufficient pressure to initially maintain a liquid-phase system. For example, the reaction may be conducted in an inert atmosphere, e.g., under nitrogen, at a pressure of 50 to 500 p.s.i.g. During the course of the process, removal from the system of water, e.g., by azeotroping, is helpful, but not mandatory.

The process of the invention is conducted in the presence of or in the absence of a solvent. Usually the alcohol reactants act as solvents, but it may sometimes be desirable to use a solvent where the nature of the alcohol reactant or a desire to operate at a certain temperature requires it. Solvents that are suitable are those capable of dissolving the reactants or catalyst, and catalyst promoter when utilized, and are inert to the reactants and the products prepared therefrom. Exemplary solvents are normally liquid aromatic hydrocarbons such as benzene, toluene and xylene; hydrocarbons such as naphtha; halogenated hydrocarbons such as chloroform, carbon tetrachloride, tetrachloroethylene, methylene chloride and bromoform; and normally liquid simple dialkyl ethers such as diisopropyl ether and dibutyl ether. The solvent, if any, is employed in a wide range of molar amount and from about ⅓ mole of solvent up to about 150 mole per mole of total reactants are satisfactory; in general a molar excess over the amount of total reactants is preferred. For convenience in avoiding the need to separate solvent from the reaction product, it is generally preferable to conduct the reaction in the absence of added solvent whenever the physical characteristics of the system at reaction temperature will allow. For example, when the process of the invention is employed with a reaction mixture normally liquid at reaction temperature, the process is typically conducted in the absence of solvent. Alternatively, if the reaction mixture is unduly viscous or normally solid at the reaction temperature, solvent is preferably employed to maintain the reactants in the liquid phase. A solvent may also be desired to assist in removal of water.

Subsequent to reaction, the reaction mixture is separated and the desired product recovered by conventional means such as selective extraction, fractional distillation and chromatographic techniques.

The allylic ether products obtained in the process of the invention are useful as monomers which can be polymerized either alone or with other ethylene monomers such as ethylene, styrene, acrylonitrile and the like. Those which contain a hydroxyl group as well as an ethylenic group are useful as cross-linking agents in the production of resins such as polyester and alkyd resins. Allylic ethers may be converted to glycidyl ethers, which also may be used in forming useful resins. Polymeric allylic ethers, such as poly(butenylene glycol) obtained from 2-butene-1,4-diol, can be hydrogenated to the corresponding saturated compounds, e.g., poly(tetramethylene glycol), which are useful for reaction with diisocyanates to produce polyurethanes.

Example 1

To a glass-lined stainless-steel tube were charged 0.49 g. of crotyl alcohol, 0.44 g. of methanol and catalyst as indicated in Table 1 below. The mixture was heated at 100° C. for 16 hours under nitrogen at 100 p.s.i.g. Gas-liquid chromatographic (GLC) analysis of the product mixture indicated the percent conversion given in Table 1 to crotyl methyl ether based on crotyl alcohol charged.

TABLE 1

| | Catalyst | | Conversion to crotyl methyl ether percent |
|---|---|---|---|
| | Composition | Amount, percent wt.[1] | |
| (a) | Cupric chloride | 1.1 | 60 |
| (b) | Cupric bromide | 1.0 | 50 |
| (c) | Cuprous chloride | 1.06 | 0 |
| (d) | Cupric sulfate | 1.0 | 10 |
| (e) | Cupric fluoride dihydrate | 1.0 | 0 |
| (f) | Cupric acetate | 1.0 | 0 |
| (g) | Cupric acetylacetonate | 1.0 | 0 |

[1] Based on crotyl alcohol.

In Table 1, (c) through (g) represent comparative data and are not within the scope of the invention.

Example 2

To a glass-lined stainless-steel tube were charged 1 g. of allyl alcohol, catalyst and catalyst promoter as indicated in Table 2 below. The mixture was heated at 100° C. for 16 hours under nitrogen at 100 p.s.i.g. GLC analysis of the product mixture indicated the percent conversion given in Table 2 to diallyl ether based on allyl alcohol charged.

TABLE 2

| | Catalyst | | Catalyst promoter | | Conversion to diallyl ether, percent |
|---|---|---|---|---|---|
| | Composition | Amount, percent wt.[1] | Composition | Amount, percent wt.[1] | |
| (a) | Cupric chloride | 1.2 | Hydrochloric acid | 1.2 | 72 |
| (b) | Cupric bromide | 1.2 | Hydrobromic acid | 1.8 | 72 |
| (c) | Cupric chloride | 1.1 | Allyl chloride | 6.0 | 91 |
| (d) | do | 1.1 | p-Toluenesulfonic acid | 5.4 | 55 |
| (e) | do | 1.1 | None | 0 | 14 |
| (f) | Cuprous chloride | 1.1 | do | 0 | 0 |
| (g) | None | 0 | Hydrochloric acid | 1.1 | <1 |
| (h) | Cuprous chloride | 1.2 | do | 1.2 | 50 |
| (i) | do | 1.1 | p-Toluenesulfonic acid | 5.7 | 31 |

[1] Based on allyl alcohol.

In Table 2, (f) through (i) represent comparative data and are not within the scope of the invention.

Example 3

To a glass-lined stainless-steel tube were charged 1 g. of 2-butene-1,4-diol, catalyst and catalyst promoter as indicated in Table 3 below. The mixture was heated at the indicated temperature for 16 hours under nitrogen at 100 p.s.i.g. GLC analysis of the product mixture indicated the percent conversion (based on diol charged) given in Table 3 to poly(butenylene glycol) of molecular weight of about 368 to about 718.

TABLE 3

| Catalyst | | Catalyst promoter | | Temperature, °C. | Conversion to poly-(butylene glycol), percent |
|---|---|---|---|---|---|
| Composition | Amount, percent wt.[1] | Composition | Amount, percent wt.[1] | | |
| Cupric chloride | 1.0 | None | 0 | 100 | 90 |
| Do | 1.0 | do | 0 | 75 | 65 |
| Do | 1.1 | Hydrochloric acid | 1.5 | 75 | 90 |

[1] Based on the diol.

I claim as my invention:

1. The process of producing allylic ethers by reacting allylic alcohol of the formula

R—CH=CH—CHR'—OH where R is hydrogen, methyl or hydroxymethyl and R' is hydrogen or methyl with itself or with a non-allylic alcohol in the presence as catalyst of 0.1 to 7% weight based on the allylic alcohol reactant of cupric halide where the halide is chloride or bromide, at a temperature of from about 50° to 150° C., wherein said non-allylic alcohol is a non-tertiary alcohol of up to 20 carbon atoms having from 1 to 2 hydroxyl groups and is selected from the class consisting of acyclic and cyclic hydroxyalkanes.

2. The process of claim 1 wherein the non-allylic alcohol is a monohydric acyclic hydroxyalkane of 1 to 12 carbon atoms.

3. The process of claim 1 which comprises reacting allyl alcohol with itself to produce diallyl ether.

4. The process of claim 1 which comprises reacting 2-butene-1,4-diol with itself to produce poly(butenylene glycol).

5. The process of claim 1 conducted in the presence of 0.1 to 7% weight based on the allylic alcohol reactant of a catalyst promoter selected from the class consisting of a strong acid and an allylic halide, wherein the strong acid is selected from the group consisting of hydrochloric acid, hydrobromic acid and p-toluenesulfonic acid and the allylic halide is selected from the group consisting of allyl chloride and allyl bromide.

6. The process of claim 5 in which said acid is hydrochloric acid.

7. The process of claim 5 in which said acid is hydrobromic acid.

8. The process of claim 5 in which said acid is p-toluenesulfonic acid.

9. The process of claim 5 in which the catalyst promoter is allyl chloride.

References Cited

UNITED STATES PATENTS

| | | | |
|---|---|---|---|
| 2,847,477 | 8/1958 | Watanabe et al. | 260—614X |
| 2,847,478 | 8/1958 | Hwa et al. | 260—611 |
| 3,140,303 | 7/1964 | De La Mre et al. | 260—614X |
| 3,250,813 | 5/1966 | Stephenson | 260—614 |
| 3,250,814 | 5/1966 | Stephenson | 260—614X |
| 3,271,461 | 9/1966 | Stephenson | 260—614 |

FOREIGN PATENTS

| | | | |
|---|---|---|---|
| 690,171 | 7/1964 | Canada | 260—611 |

OTHER REFERENCES

Watanabe et al.: J. Org. Chem., 23, No. 11, pp. 1666–8, 1958.

HOWARD T. MARS, Primary Examiner

U.S. Cl. X.R.

260—77.5, 611, 615